United States Patent
Nakano (10) Patent No.: US 9,857,057 B2
(45) Date of Patent: Jan. 2, 2018

(54) LIGHTING APPARATUS THAT UTILIZES HONEY-COMB STRUCTURED OPTICAL COMPONENT TO REDUCE LIGHT UNEVENNESS WHILE MAINTAINING LIGHT TRANSMISSIVITY IN THE IRRADIATION REGION

(71) Applicant: PANASONIC INTELLECTUAL PROPERTY MANAGEMENT CO., LTD., Osaka (JP)

(72) Inventor: Yoshiyuki Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/292,743

(22) Filed: Oct. 13, 2016

(65) Prior Publication Data

US 2017/0108196 A1 Apr. 20, 2017

(30) Foreign Application Priority Data

Oct. 16, 2015 (JP) ................. 2015-204989

(51) Int. Cl.
*F21V 9/08* (2006.01)
*F21V 3/04* (2006.01)
(Continued)

(52) U.S. Cl.
CPC .................. *F21V 9/08* (2013.01); *F21V 3/04* (2013.01); *F21V 5/008* (2013.01); *F21V 5/04* (2013.01); *F21V 9/16* (2013.01); *G02B 3/00* (2013.01); *G02B 6/0008* (2013.01); *F21Y 2115/30* (2016.08)

(58) Field of Classification Search
CPC ... F21V 9/08; F21V 5/008; F21V 5/04; F21V 3/04; F21V 9/16; G02B 3/00; G02B 6/0008; F21Y 2115/30
See application file for complete search history.

(56) References Cited

U.S. PATENT DOCUMENTS

D744,156 S * 11/2015 Kjaergaard Toft .......... D26/120
2011/0096553 A1* 4/2011 Shimokawa .............. F21V 5/04
362/311.02
(Continued)

FOREIGN PATENT DOCUMENTS

JP 2012-173522 9/2012

*Primary Examiner* — Tracie Y Green
(74) *Attorney, Agent, or Firm* — Greenblum & Bernstein, P.L.C.

(57) ABSTRACT

A lighting apparatus which has a light emitter that emits light of a different wavelength from a laser light with which the lighting apparatus is irradiated is provided. The lighting apparatus includes a condenser lens that condenses the laser light, a focusing lens that focuses the laser light that has passed through the condenser lens, and an optical component disposed between the condenser lens and the focusing lens. The optical component includes a plurality of lenses disposed at a plurality of locations on circumferences of virtual concentric circles. The virtual concentric circles include a center which is an origin. Lenses which are adjacent along a radial axis passing through the origin, among the plurality of lenses, have different phases with respect to the radial axis.

17 Claims, 11 Drawing Sheets

(51) Int. Cl.
*F21V 5/04* (2006.01)
*F21V 9/16* (2006.01)
*F21V 8/00* (2006.01)
*F21V 5/00* (2015.01)
*G02B 3/00* (2006.01)
*F21Y 115/30* (2016.01)

(56) References Cited

U.S. PATENT DOCUMENTS

2012/0212965 A1 8/2012 Nakamura et al.
2017/0108182 A1* 4/2017 Nakano ................ G02B 6/0006
2017/0254508 A1* 9/2017 Kawachi ................ F21V 11/10

* cited by examiner

LIGHTING APPARATUS THAT UTILIZES HONEY-COMB STRUCTURED OPTICAL COMPONENT TO REDUCE LIGHT UNEVENNESS WHILE MAINTAINING LIGHT TRANSMISSIVITY IN THE IRRADIATION REGION

CROSS REFERENCE TO RELATED APPLICATION

This application claims the benefit of priority of Japanese Patent Application Number 2015-204989 filed on Oct. 16, 2015, the entire content of which is hereby incorporated by reference.

BACKGROUND

1. Technical Field

The present disclosure relates to a lighting apparatus which uses laser light as a light source.

2. Description of the Related Art

Conventionally, in a lighting apparatus, etc., there are instances where light, is not emitted evenly from the light exiting face, and unevenness such as illumination unevenness and color unevenness occurs in an irradiation region which is the region that is illuminated when an object is irradiated with light. Various devices and methods for reducing such unevenness have been proposed.

For example, as a technique for reducing unevenness in the irradiation region, there is a known technique in which an optical component, which has a honeycomb structure of seamlessly arranged regular hexagon-shaped concave or convex small lenses, is provided in the light exiting face of a lighting apparatus. This honeycomb-structured optical component is attached to the lighting apparatus as a cover to thereby create light attenuation areas having different transmissivity so as to interfere with the light and reduce unevenness in the irradiation region while maintaining light transmissivity.

In addition, a lighting apparatus described in Japanese Unexamined Patent Application Publication No. 2012-173522 (Patent Literature 1) reduces unevenness in the periphery of an irradiation region by using, in the light exiting face, an optical component having randomly arranged small lenses.

SUMMARY

However, although lighting apparatuses are required not only to suppress unevenness but also to control light distribution, combining both unevenness suppression and a degree of freedom of light distribution control is difficult in terms of optical component design.

In view of this, the present disclosure provides a lighting apparatus capable of improving the degree of freedom of light distribution control while suppressing the occurrence of unevenness which is a cause of bad appearance of an irradiation region.

A lighting apparatus according to an aspect of the present disclosure is a lighting apparatus which uses laser light as a light source, and includes a light emitter which, when irradiated with the laser light, emits light of a wavelength different from a wavelength of the laser light, the lighting apparatus including: a condenser lens that condenses the laser light; a focusing lens that focuses, onto the light emitter, the laser light that has passed through the condenser lens; and an optical component disposed between the condenser lens and the focusing lens, the optical component including a plurality of lenses disposed at a plurality of locations on circumferences of virtual concentric circles, the virtual concentric circles including a center which is an origin, wherein lenses which are adjacent along a radial axis passing through the origin, among the plurality of lenses, have different phases with respect to the radial axis.

According to a lighting apparatus according to an aspect of the present disclosure, unevenness of visible light radiated from the light emitter can be suppressed by suppressing the unevenness at the stage of the laser light which is the excitation light source. As such, since light distribution of visible light can be controlled while suppressing the occurrence of unevenness which is a cause of bad appearance of an irradiation region, it is possible to improve optical component design freedom.

BRIEF DESCRIPTION OF DRAWINGS

The figures depict one or more, implementations in accordance with the present teaching, by way of examples only, not by way of limitations. In the figures, like reference numerals refer to the same or similar elements.

DETAILED DESCRIPTION OF THE EMBODIMENTS

Hereinafter, a lighting apparatus according to exemplary embodiments of the present disclosure will be described using the drawings. It should be noted that each of the subsequently-described embodiments shows a specific example. Therefore, numerical values, shapes, materials, structural components, the arrangement and connection of the structural components, etc. shown in the following exemplary embodiments are mere examples, and are not intended to limit the scope of the present disclosure. Furthermore, among the structural components in the following exemplary embodiments, components not recited in any one of the independent claims which indicate the broadest concepts of the present disclosure are described as arbitrary structural components.

Furthermore, the respective figures are schematic diagrams and are not necessarily precise illustrations. In addition, in the respective diagrams, identical structural components are given the same reference signs.

Embodiment 1

An embodiment is described below.

{Configuration of Lighting Apparatus}

Figure 1:
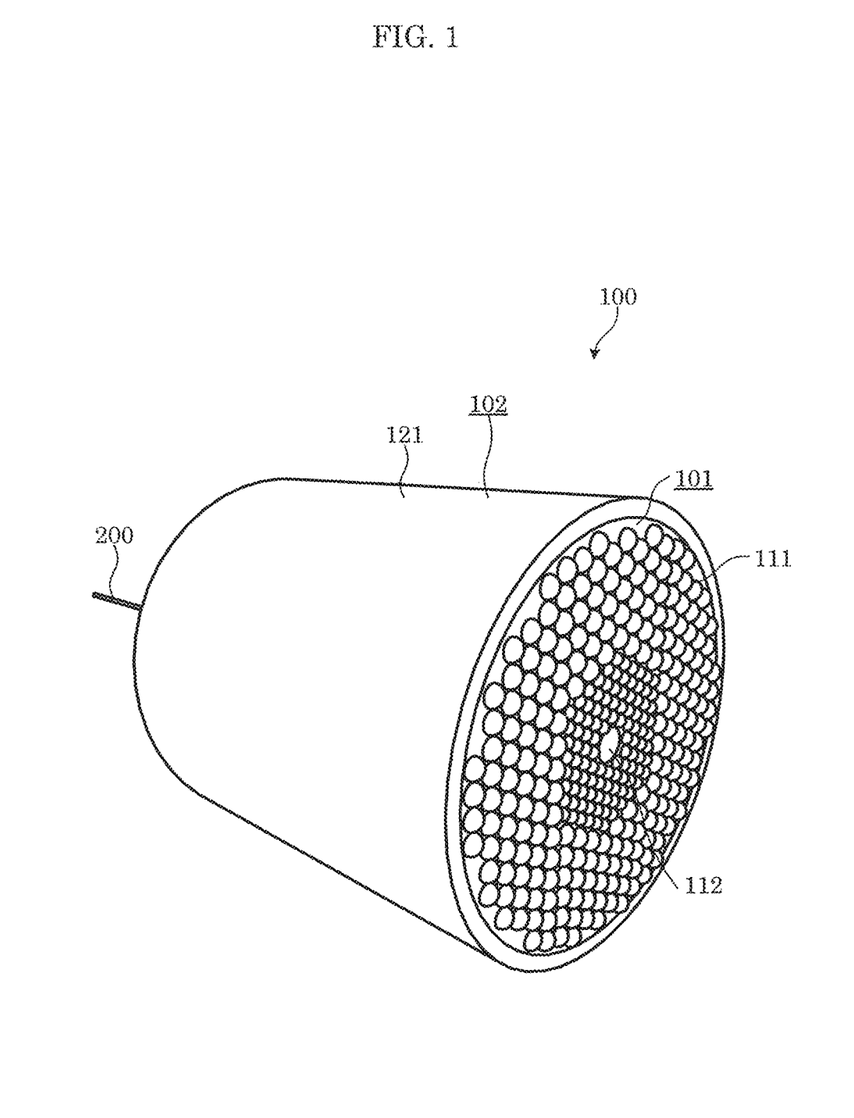
FIG. 1 is a perspective view of the external appearance of a lighting apparatus according to an embodiment.

FIG. 1 is a perspective view illustrating an external appearance of a lighting apparatus.

Figure 2:
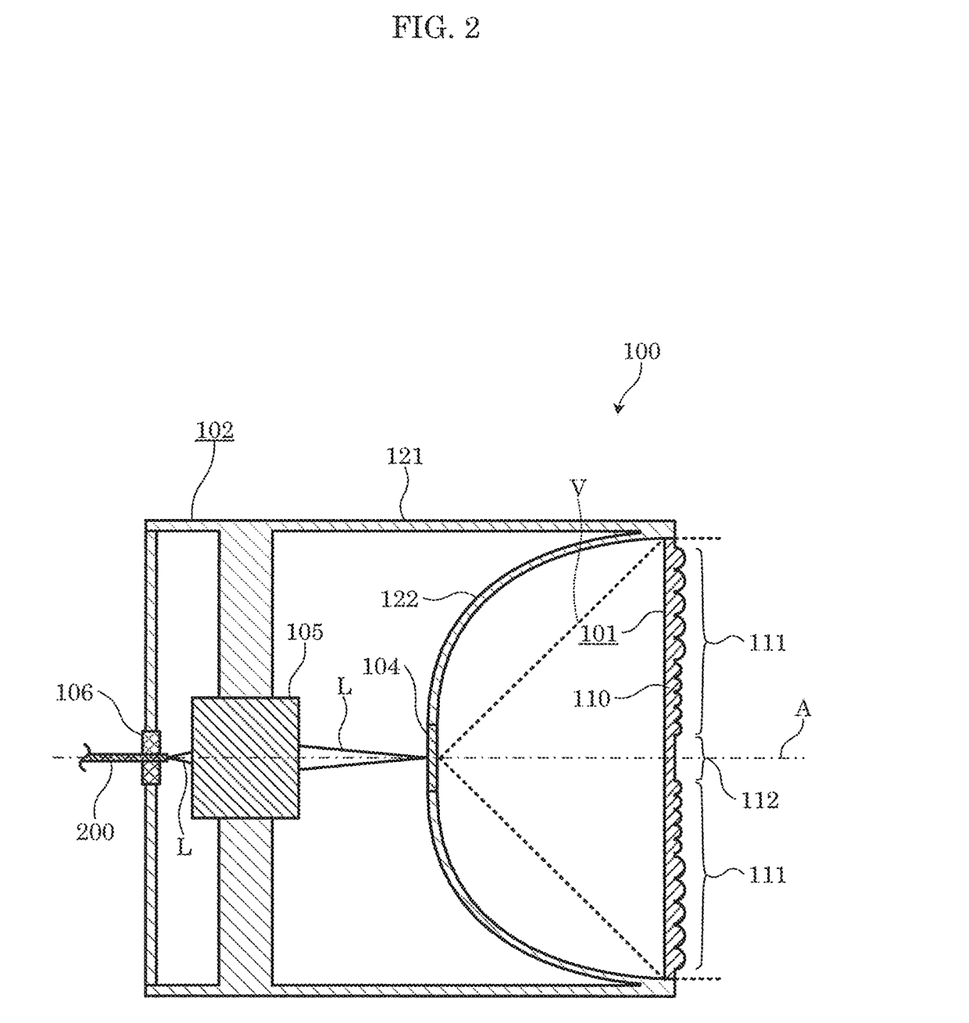
FIG. 2 is a cross-sectional view of the lighting apparatus according to the embodiment.

FIG. 2 is a cross-sectional view of the lighting apparatus.

As illustrated in these figures, lighting apparatus 100 is an apparatus that emits visible light, using laser light L as a light source, and includes light emitter 104 and cover 101. Furthermore, in this embodiment, lighting apparatus 100 includes case 102, optical system 105, and fiber attachment component 106.

As illustrated in FIG. 2, light emitter 104, when irradiated with laser light L, radiates light of a different wavelength, from laser light L, light emitter 104, for example, includes, in a dispersed state, phosphor particles which generate fluorescence when excited by laser light L, and irradiation with laser light L causes the phosphors to generate fluorescence that is of a different wavelength from laser light L. Specifically, light emitter 104 can be exemplified as a component in which phosphor particles are dispersed inside a transparent resin or glass base material, or a component in which phosphor particles are packed tightly together. In other words, light emitter 104 can be referred to as a wavelength conversion component which converts laser light into fluorescence.

In this embodiment, light emitter 104 radiates white light, and includes, in the appropriate ratio, three types of phosphors, namely, a first phosphor that emits red light, a second phosphor that emits blue light, and a third phosphor that emits green light, when irradiated with laser light L.

Although there is no particular limitation on the type or characteristics of the phosphors, it is desirable for the phosphor to have high heat resistance since laser light L, which has a comparatively high output, serves as the excitation light.

Furthermore, although there is no particular limitation on the type of the material holding the phosphors in the dispersed state, the material, for example, has high transparency since higher transparency enhances radiation efficiency of white light. Furthermore, the material, for example, has high heat resistance since laser light L, which has comparatively high output, is incident thereon.

Furthermore, light emitter 104 may include a function film for efficiently irradiating the phosphors with laser light L, a function film for efficiently radiating emitted visible light, etc.

Cover 101 is a component disposed, with respect to light emitter 104, on a side opposite to the side that is irradiated with laser light L (in this embodiment, the side on which optical system 105 is disposed). Cover 101 includes light distribution controlling structure 111 which controls the light distribution of the light (visible light V) radiated from light emitter 104. Cover 101 integrally includes, in and about a portion through which optical axis A of laser light L passes, light-dispersing structure 112 which is a structure that disperses laser light L. It should be rioted that since light-dispersing structure 112 is a small structure compared to light distribution controlling structure 111, light-dispersing structure 112 is not illustrated in detail in FIG. 1 and FIG. 2.

Although there is no particular limitation on the material of cover 101 as long as visible light V radiated from light emitter 104 is transmitted, a material that enables light distribution controlling structure 111 and light-dispersing structure 112 to be formed integrally, for example, may be used. A resin material such as acrylic or polycarbonate or a glass material, etc. can be given as examples of a material of cover 101.

Furthermore, cover 101 is, along with case 102, a comparatively large component in lighting apparatus 100, and is a component that is larger than at least light emitter 104. Furthermore, cover 101 is disposed at a position that is visible from the outside of lighting apparatus 100. Therefore, it is easily noticeable if cover 101 falls off from lighting apparatus 100, and it is also easily noticeable if cover 101 is chipped or cracked.

Furthermore, since cover 101 is a comparatively large component, cover 101 can be firmly attached to case 102, and thus the possibility of cover 101 falling off from case 102 can be reduced as much as possible.

Figure 3:
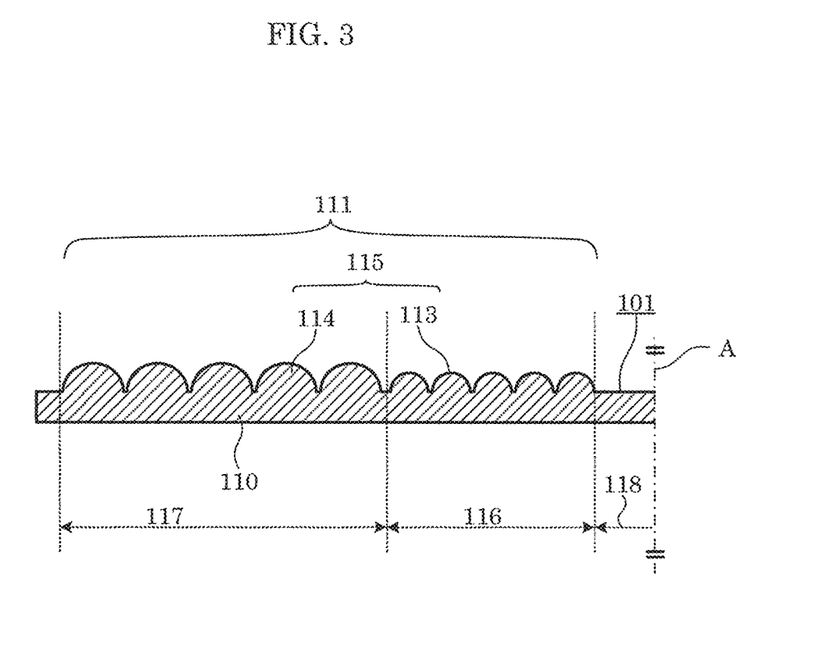
FIG. 3 is a cross-sectional view of a light distribution controlling structure of a cover according to the embodiment.

FIG. 3 is a cross-sectional view of the light distribution controlling structure of the cover.

As illustrated in the figure, light distribution controlling structure 111 is a component for mixing the colors of the visible light spreading in a radial direction from light emitter 104, and forming light having the desired spreading for lighting apparatus 100 (including parallel light), and has a structure in which a plurality of structural units 115 are aligned on a face that crosses (including orthogonal to) optical axis A. Here, structural units 115 are one of the elements that make up light distribution controlling structure 111. Furthermore, in this embodiment, structural units 115 included in light distribution controlling structure 111 have mutually identical shapes or similar shapes.

In this embodiment, light distribution controlling structure 111 includes first structural units 113 in refracting region 116 which is a region close to optical axis A, and includes second structural units 114 in reflecting region 117 which is a region that is farther from optical axis A than refracting region 116 is.

Refracting region 116 is a region in which first structural units 113 disposed therein control light distribution by mainly refracting visible light V radiated from light emitter 104.

Reflecting region 117 is a region in which second structural units 114 disposed therein control light distribution by mainly reflecting (including total internal reflection) visible light V radiated from light emitter 104.

It should be noted that the area of first structural units 113, that is, the area of cover 101 occupied by first structural units 113 when first structural units 113 are seen along the direction of optical axis A, or what is called the plan view area, is smaller than the area of second structural units 114. Accordingly, light distribution can be effectively controlled, and visible light V emitted from cover 101 can be collimated.

Furthermore, in this embodiment, structural units 115 are semispherical structures integrally projecting from a disc-shaped base portion 110. It should be noted that there is no particular limitation on the shape of structural units 115, and an arbitrary shape may be adopted. For example, the shape of structural units 115 may be recessed from the surface of base portion 110, and may be a combination of concave and convex shapes. Furthermore, an arbitrary shape, such as conical, triangular, quadrangular pyramidal, may be adopted as the shape of structural units 115. Furthermore, light distribution controlling structure 111 may be configured with a mix of structural units 115 having different shapes.

Figure 4:
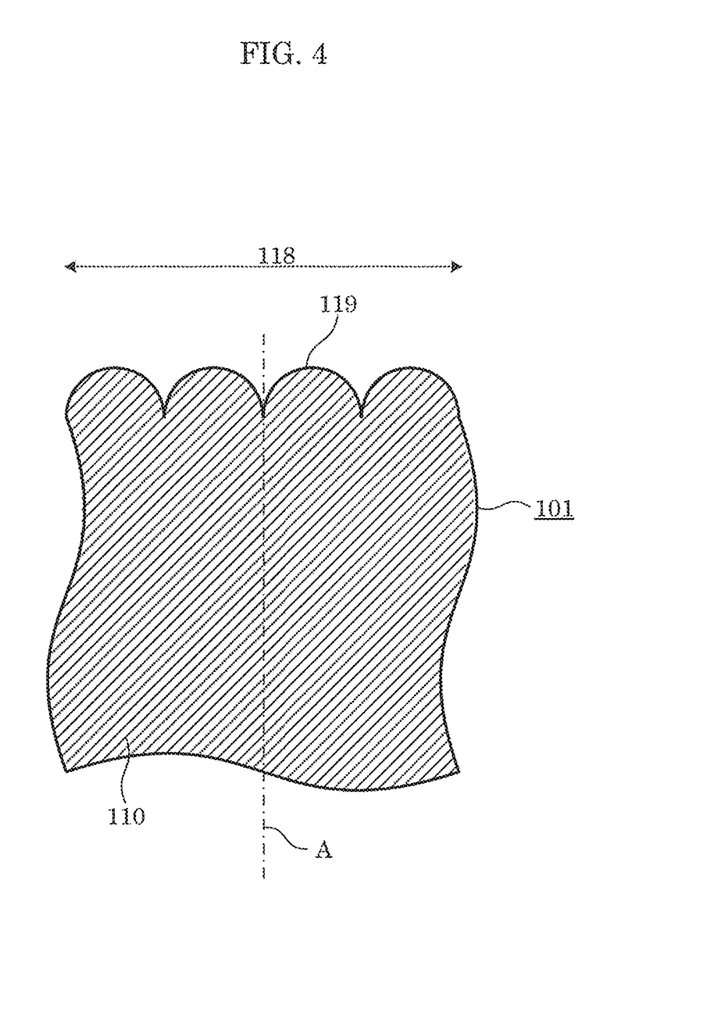
FIG. 4 is a cross-sectional view of a light dispersing structure of the cover according to the embodiment.

FIG. 4 is a cross-sectional view of the light-dispersing structure of cover.

Light-dispersing structure, 112 is a component for improving the safety of lighting apparatus 100 by dispersing coherent laser light reaching cover 101 to a degree that has no impact on human eyes, in the case where light emitter 104 cracks or falls off from case 102, etc. As illustrated in the figure, light-dispersing structure 112 has a configuration in which structural units are aligned on a face which crosses (including orthogonal to) optical axis A and which optical axis A passes through. Here, the region in which light-dispersing structure 112 is disposed is described as dispersion region 118, and the structural units disposed in dispersion region 118 are described as third structural units 119.

Light-dispersing structure 112 can be exemplified as a structure in which third structural units 119 are periodically arranged to form a diffraction grating, or as a structure in which third structural units 119 are non-periodically (randomly) arranged. Furthermore, the distance between adjacent third structural units 119 is in the order of microns in both the periodic structure and non-periodic structure. Accordingly, laser light L which has a shorter wavelength than visible light V radiated from light emitter 104 can be dispersed up to a degree that has, no impact on human eyes.

Specifically, the distance between adjacent third structural units 119 of light-dispersing structure 112 is less than or equal to 1/100th of the distance between adjacent first structural units 113 or the distance between adjacent second structural units 114 of light distribution, controlling structure 111. Furthermore, when light-dispersing structure 112 has a periodic structure, the distance (interval) between adjacent third structural units 119 is preferably less than or equal to 50 microns. Furthermore, when light-dispersing structure 112 has a non-periodic structure, the distance between adjacent third structural units 119 is less than or equal to 500 microns at most, and preferably at least 1 micron and at most 100 microns on average.

The shape of third structural units 119 is not particularly limited, a three-dimensional shape including a spherical surface or a surface based on a polynomial curve, a concave shape or a convex shape such as a triangular prism, a quadrangular prism, a trigonal pyramid, or a polygonal pyramid can be given as examples. Furthermore, all third structural units 119 need not have the same shape, and may have mutually different shapes.

In this embodiment, third structural units 119 has a semispherical shape integrally projecting from disc-shaped base portion 110, and are provided on the same face of base portion 110 as the face from which first structural units 113 and second structural units 114 project.

Dispersion region 118 needs to be sized and positioned to include the region of cover 101 that is irradiated with the laser light, in the case where light emitter 104 falls off from case 102. For example, the size of dispersion region 118 needs to satisfy $a \geq L \cdot \tan \theta$, where a is the diameter of dispersion region 118, L is the distance from the light exit end of optical fiber 200 to dispersion region 118 in the case where optical system 105 (see FIG. 2) is not present and $\theta$ is the angle of divergence of light exiting from the light exit end of optical fiber 200. It should be noted that, when optical system 105 is included as in this embodiment, the aforementioned expression need not be satisfied, and, in the case where light emitter 104 is not present, it is sufficient that dispersion region 118 be set to cover the entirety of the laser light reaching light-dispersing structure 112.

As illustrated in FIG. 1 and FIG. 2, case 102 is a box-shaped structural component that houses light emitter 104 and optical system 105, with cover 101 being attached to one end and fiber attachment component 106 being attached on the other end. In this embodiment, case 102 includes a cylindrical outer shell portion 121 and an inner shell portion 122 which holds light emitter 104 and reflects light radiated from light emitter 104 to the direction of cover 101.

Furthermore, case 102 is a component that covers the optical path of laser light L. In this embodiment, a component or structure which absorbs laser light L is provided on the inner circumferential surface of case 102 (illustration omitted).

Here, a component that absorbs laser light is, for example, a component which includes a pigment that absorbs blue color when the laser light is blue. Furthermore, a structure that absorbs laser light is a structure, etc., that causes irregular reflection and quenching of laser light by providing fine small lenses on the inner circumferential surface. Accordingly, the safety of lighting apparatus 100 can be maintained at a high state even when optical axis A of laser light L shifts unintentionally.

Optical system 105 is a set of lenses which are set to condense incident laser light L onto light emitter 104.

Figure 5:
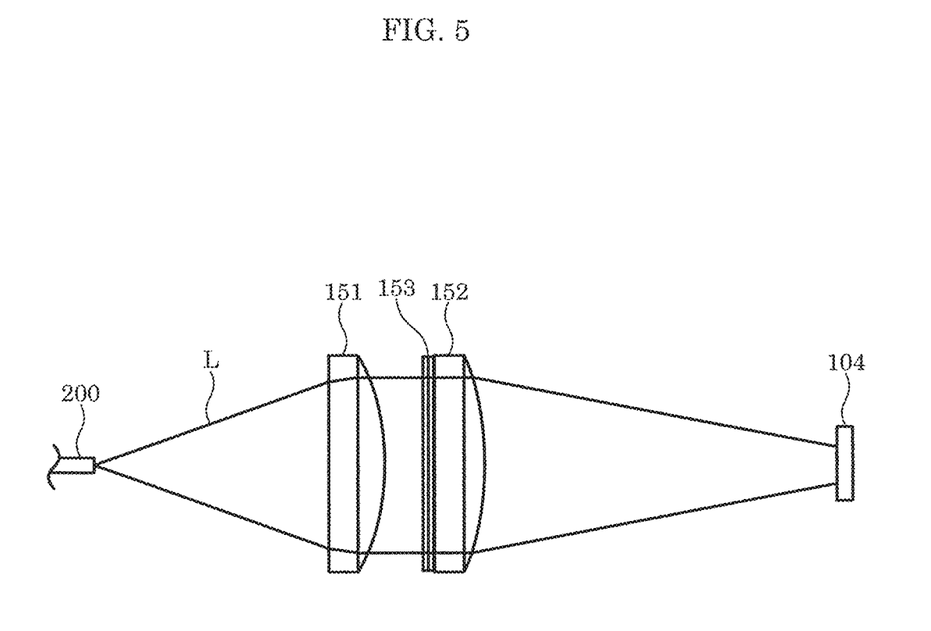
FIG. 5 is a side view illustrating in detail an optical system of the lighting apparatus according to the embodiment.

FIG. 5 is a side view illustrating the optical system in detail.

As shown in the figure, optical system 105 includes condenser lens 151, focusing lens 152, and optical component 158.

Condenser lens 151 is a lens capable of condensing laser light L. In this embodiment, the light exiting end of optical fiber 200 is disposed at a focus point, and condenser lens 151 collimates the laser light L that is emitted with a predetermined spreading from the light exiting end of optical fiber 200.

Focusing lens 152 is a lens that focuses laser light L which has passed through condenser lens 151, onto light emitter 104.

Figure 6:
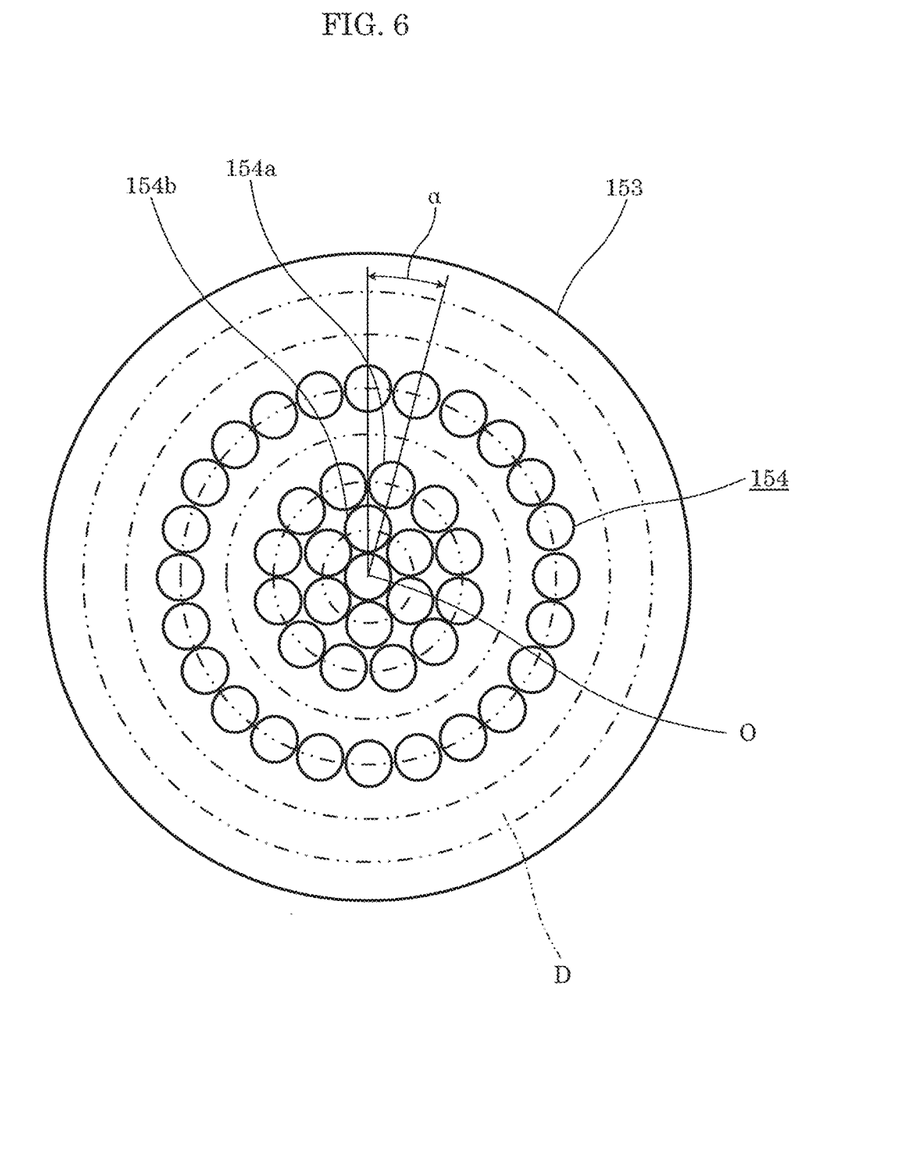
FIG. 6 is a diagram for describing the arrangement of small lenses formed on the surface of an optical component according to the embodiment.

FIG. 6 is a diagram for describing the placement of small lenses in the optical component.

As illustrated in FIG. 5 and FIG. 6, optical component 153 is disposed between condenser lens 151 and focusing lens 152, and is what is called a homogenizer which converts the light intensity distribution of the laser light, from a Gaussian distribution into a top-hat distribution, using small lenses 154 disposed side-by-side. In this embodiment, as illustrated in FIG. 6, a plurality of small lenses 154 which are circular in a plan view are arranged side-by-side in each of virtual concentric circles D about origin O, on the surface of optical component 153. It should be noted that the plan view shape of small lenses 154 is not limited to a circle, and may be another shape such as a polygon, etc. Furthermore, small lenses 154 may have a dimple shape or a projecting shape.

Small lenses 154 formed on the surface of optical component 153 are arranged as follows. Specifically, small lenses 154, which are adjacent along a radial axis passing through origin O which is the center of virtual concentric circles D, are disposed at positions resulting in mutually different phases (for example, a phase difference $\alpha$ is created between small lens 154a and small lens 154b in FIG. 6). In this embodiment, small lenses 154 are arranged so that all the phases of adjacent small lenses 154 are offset. In addition, as illustrated in FIG. 6, intervals between adjacent virtual concentric circles are equal.

Fiber attachment component 106 is a component for attaching optical fiber 200 to case 102 in such a way that optical fiber 200 is aligned with a predetermined optical axis. Optical fiber 200 transmits the laser light emitted from light source apparatus 202 (see FIG. 10) which is a separate body from lighting apparatus 100. Fiber attachment component 106 enables optical fiber 200 to be attached in such a way that optical axis A of laser light L passes through dispersion region 118.

[Mode of Use of Lighting Apparatus]

Next, the mode of use of lighting apparatus 100 having the above described configuration will be specifically described.

Figure 7:
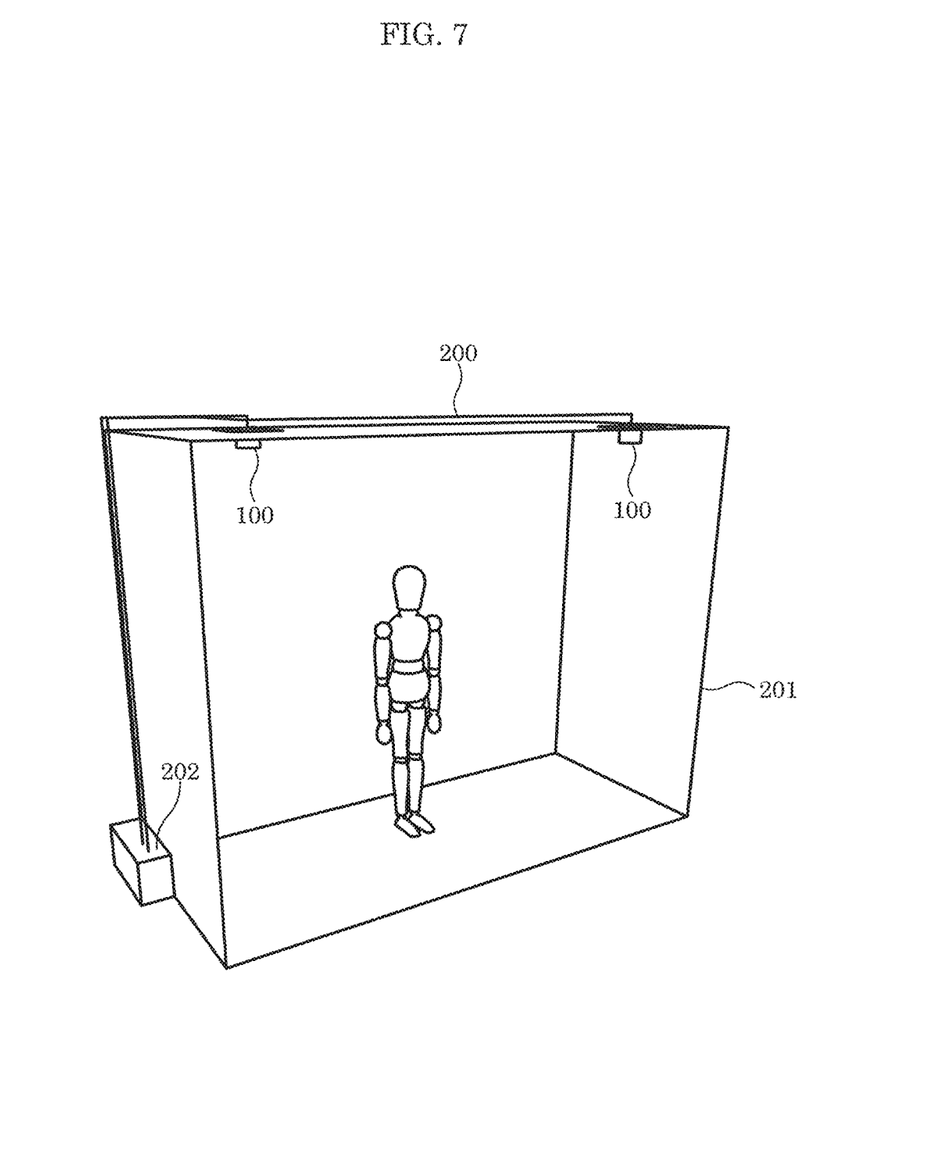
FIG. 7 is a diagram schematically illustrating a mode of use of the lighting apparatus according to the embodiment.

In this embodiment, as illustrated in FIG. 7, lighting apparatus 100 is used as an apparatus that is attached to the ceiling, etc. of building 201, for illuminating the room. Furthermore, light source apparatus 202 is provided outside building 201, and the laser light emitted from light source apparatus 202 is transmitted to lighting apparatus 100 by optical fiber 200 which is laid out outside building 201.

Light source apparatus 202 is an apparatus that generates laser light and supplies the laser light to a plurality of lighting apparatuses 100 by using optical fiber 200. Specifically, for example, light source apparatus 202 includes a plurality of semiconductor laser elements which emit laser light of a wavelength selected from a blue-violet to blue (430 nm to 490 nm) range. In this manner, disposing the semiconductor laser elements in one place enables the cooling devices that cool the semiconductor laser elements to be centralized, and thus cooling efficiency can be enhanced and the waste heat can be utilized for water heating, etc.

The laser light emitted from light source apparatus 202 is transmitted via optical fiber 200, and laser light L radiated from the attached end of optical fiber 200 is introduced inside lighting apparatus 100, as illustrated in FIG. 2.

Then, laser light L that has passed through optical system 105 has its light intensity distribution converted, from a Gaussian distribution to a top-hat distribution, and is emitted to light emitter 104 in a state where the shape of the irradiation region is close to being circular.

In light emitter 104, fluorescence in a plurality of wavelengths is generated by different types of phosphors using the irradiated laser light as excitation light, and light which can be seen as white overall is emitted. The visible light radiated from light emitter 104 undergoes light distribution control by light distribution controlling structure 111 provided in cover 101 and is emitted from lighting apparatus 100.

In the regular mode of use, the light emitted from lighting apparatus 100 undergoes the desired light distribution control by light distribution controlling structure 111, and is, for example, controlled to have narrow-angle light distribution. Here, although light-dispersing structure 112 is present in the center portion of light distribution controlling structure 111, the impact of light-dispersing structure 112 on the light radiated from light emitter 104 is small, and the impact of light-dispersing structure 112 on visible light V emitted from lighting apparatus 100 is negligible.

Figure 10:
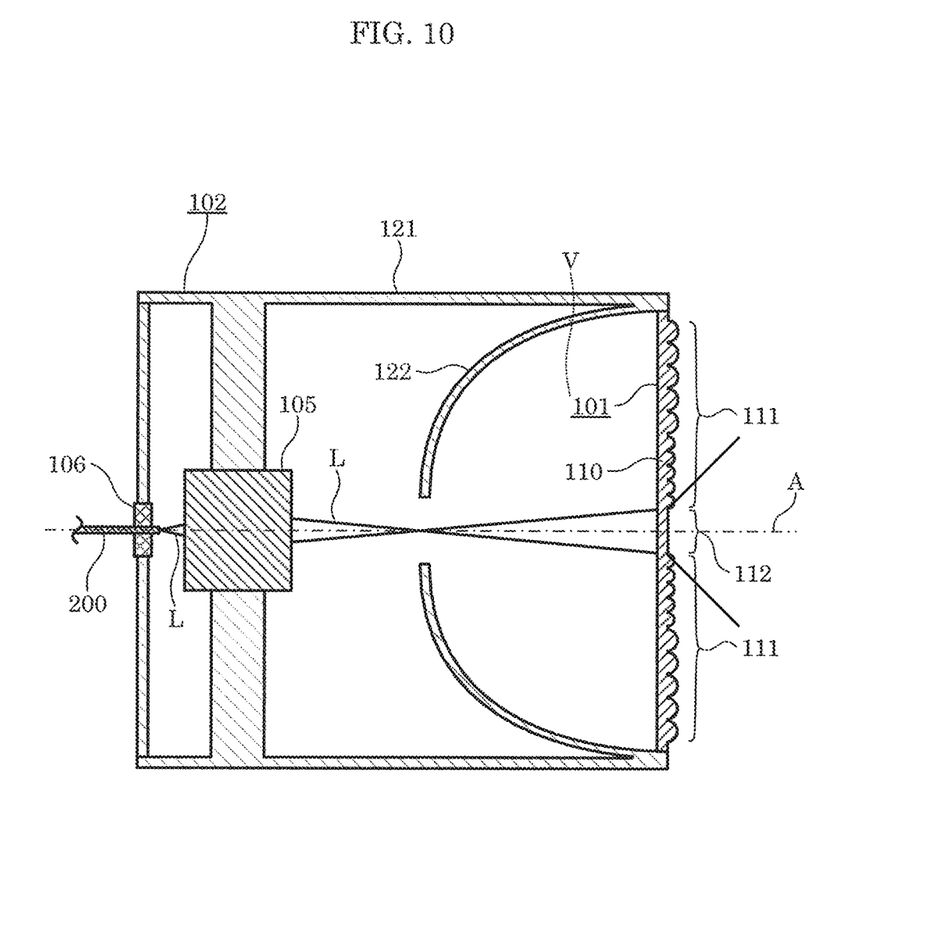
FIG. 10 is a cross-sectional view illustrating a state in which the light emitter has fallen off, in the lighting apparatus according to the embodiment.

Next, even if light emitter 104 cracks or falls off from inner shell portion 122 when shock is unintentionally imparted to lighting apparatus 100 or due to deterioration over time, and causes laser light L to directly reach cover 101, as illustrated in FIG. 10, light-dispersing structure 112 diffracts and disperses laser light L, and thus the impact that laser light L has on human eyes can be reduced even when a person looks into lighting apparatus 100.

[Advantageous Effects]

Figure 8:
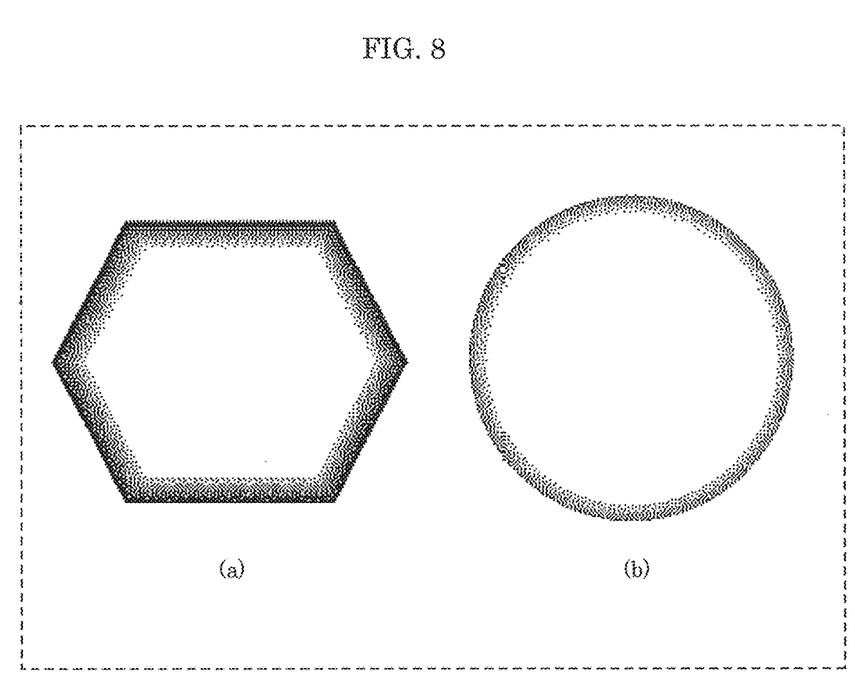
FIG. 8 is a diagram illustrating, in comparison with a conventional example, the shape of the irradiation region of laser light irradiated to the light emitter, in the lighting apparatus according to the embodiment.
Figure 9:
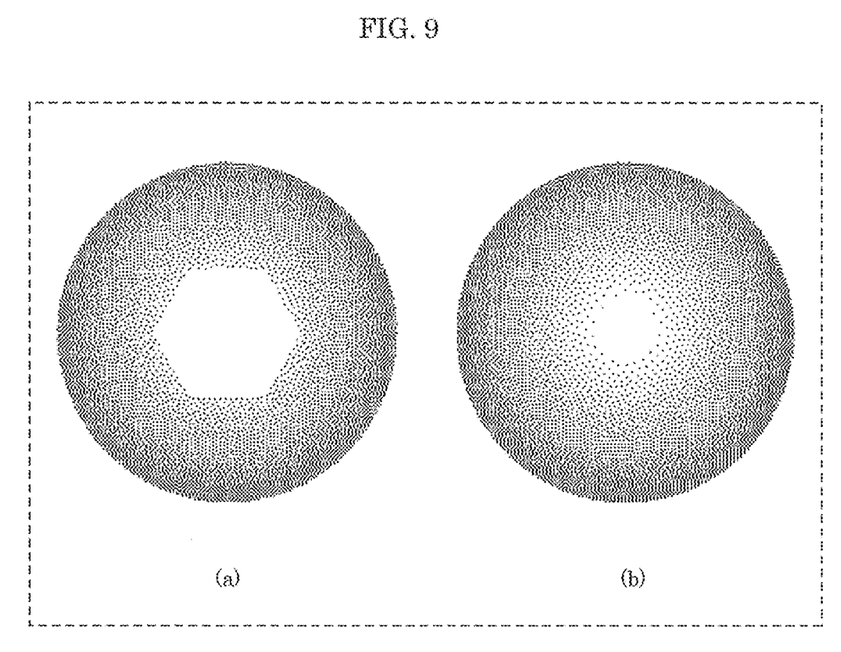
FIG. 9 is a diagram illustrating, in comparison with a conventional example, the shape of the irradiation region of visible light irradiated after undergoing light distribution control, in the lighting apparatus according to the embodiment.

As described above, the light intensity distribution of the laser light on the focused-light receiving face of light emitter 104 is converted from a Gaussian distribution into a top-hat distribution by optical component 153 disposed between condenser lens 151 and focusing lens 152. Here, since optical component 153 converts the intensity distribution of laser light beams that advance, substantially parallel, the intensity distribution can be easily converted into an unevenness-suppressed top-hat distribution. In addition, since the phases of small lenses 154 that are adjacent along the radial axis are offset, the shape of the irradiation region in the focused-light receiving face of light emitter 104 becomes circular as in the portion illustrated in (b) in FIG. 8, and not hexagonal as in the conventional optical component in which the small lenses are arranged in a honeycomb structure, as in the portion illustrated in (a) in FIG. 8 Therefore, for the light that passes through cover 101 and is emitted to a wall surface, etc., it is possible to reduce illumination unevenness and color unevenness and improve appearance of the irradiation region as illustrated (b) FIG. 9, without the pattern in light emitter 104 being formed and thus degrading the quality of light as in the portion illustrated in (a) in FIG. 9. Furthermore, by setting equal intervals between adjacent virtual concentric circles D on which the centers of small lenses 154 are disposed, design of optical component 153 can be simplified.

In addition, since lighting apparatus 100 in this embodiment uses laser light that is transmitted from external light source apparatus 202 and does not include a light source, a cooling apparatus for cooling a semiconductor laser element is not need in lighting apparatus 100 itself, and power need not be supplied to lighting apparatus 100. Therefore, lighting apparatus 100 can be made small and lightweight, and thus an inexpensive lighting apparatus can be realized.

Embodiment 2

Next, another embodiment of lighting apparatus 100 will be described. It should be noted that the same reference sign is given to components (portions) having the same operation, function, shape, mechanism, or structure as in Embodiment 1, and their description may be omitted. Furthermore, hereinafter, description shall center on the points of difference from Embodiment 1, and there are instances where description of identical matter is omitted.

In lighting apparatus 100 according to Embodiment 2, the center coordinates (x, y) of each of small lenses 154 are disposed so as to satisfy subsequent Expressions (1) to (5).

Figure 11:
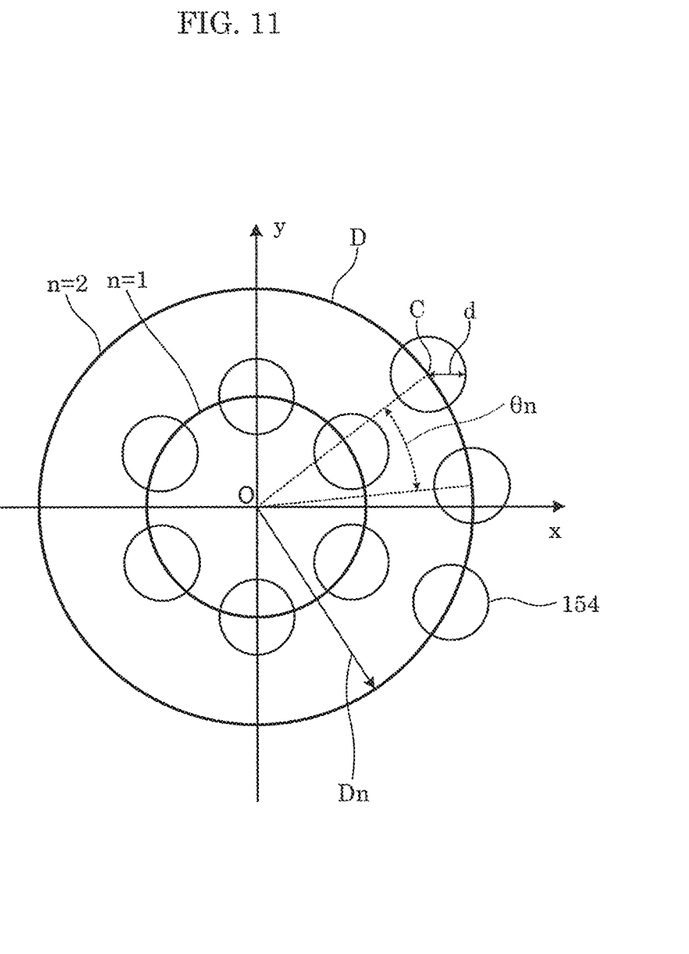
FIG. 11 is a diagram for describing variables to be used in mathematical expressions for calculating coordinates of centers of small lenses formed in an optical component included in a lighting apparatus according to Embodiments 2 and 3.

[Math. 1]

$$O < D_{n+1} - D_n \leq 2 \cdot d \qquad \text{Expression (1)}$$

where d is the radius of small lens 154 in a plan view (see FIG. 11)

n is the place in order, from origin O, of a virtual concentric circle (see FIG. 11)

Dn is the radius of nth virtual concentric circle from the origin (see FIG. 11)

[Math. 2]

$$O < k_n < 2 \cdot D_n \cdot \Pi / d \qquad \text{Expression (2)}$$

where kn is the number of small lenses on nth virtual concentric circle from the origin

[Math. 3]

$$\theta n = 360/kn \qquad \text{Expression (3)}$$

where

θn is the angle formed between the centers of adjacent small lenses on virtual concentric circle D with respect to the origin (see FIG. 11)

[Math. 4]

$$x = Dn \cdot \cos(\theta n \cdot Am + bn) \qquad \text{Expression (4)}$$

where

Am is an arithmetic progression where initial term is 1, term difference is 1, and last term is kn bn is the phase of the center C of the small lens

[Math. 5]

$$y = Dn \cdot \sin(\theta n \cdot Am + bn) \qquad \text{Expression (5)}$$

By using Expressions (1) to (5), in lighting apparatus 100 according to Embodiment 2, the coordinates of center C of small lens 154 can be easily calculated, thus enabling ease of design. Furthermore, as in Embodiment 1, small lenses 154 can be arranged along plural virtual concentric circles D which have a single point as a center, and small lenses 154 which are located on adjacent virtual concentric circles D and are adjacent to each other along a radial axis passing through origin O can be arranged at different phases, and thus occurrence of lighting unevenness can be reduced.

Embodiment 3

Next, another embodiment of lighting apparatus 100 will be described. It should be noted that the same reference sign is given to components (portions) having the same operation, function, shape, mechanism, or structure as in Embodiments 1 and 2, and their description may be omitted. Furthermore, hereinafter, description shall center on the points of difference from Embodiments 1 and 2, and description of identical matter may be omitted.

In lighting apparatus 100 according to Embodiment 3, center C of each small lens 154 is placed on coordinates (x, y) which have been calculated to satisfy subsequent Expressions (6) to (8).

[Math. 6]

$$\theta n = 360/(6 \cdot n) \qquad \text{Expression (6)}$$

where n is the place in order, from the origin, of a virtual concentric circle D (see FIG. 11)

θn is the angle formed by the center of adjacent small lenses with respect to the origin (see FIG. 11)

[Math. 7]

$$x = \sqrt{3} d \cdot n \cdot \cos(\theta n \cdot km + bn) \qquad \text{Expression (7)}$$

where d is the radius of one of the small lenses in a plan view (see FIG. 11.)

bn is the phase of the center of the one of the small lenses (the phase follows any one of a Fibonacci sequence, a tribonacci sequence, a tetranacci sequence, and uniform random numbers)

km is an arithmetic progression where initial term is 1, term difference is 1, and last term is 6·n

[Math. 8]

$$y = \sqrt{3} dn \cdot n \cdot \sin(\theta n \cdot km + bn) \qquad \text{Expression (8)}$$

Here, the Fibonacci sequence will be described. The nth Fibonacci number (Fn) is represented by Expression (9) below.

[Math. 9]

$$Fn+2 = Fn + Fn+1 \quad (n \geq 0) \qquad \text{Expression (9)}$$

Here, F0=0, F1=1

The Fibonacci sequence is a recurrence formula having two initial conditions, and each term is the sum of the preceding two terms. For example, the first few terms are 0, 1, 1, 2, 3, 5, 8, 1.3, 21, 34, 55, 89, . . . . It should be noted that Fibonacci numbers appear often in natural phenomena. For example, the number of petals is often a Fibonacci number, and phyllotaxis (arrangement of leaves on a plant) is often related to Fibonacci numbers.

Next, the tribonacci sequence will be described. The nth tribonacci number (Fn) is defined by Expression (10) below.

[Math. 10]

$$Fn+3 = Fn + Fn+1 + Fn+2 \quad (n \geq 0) \qquad \text{Expression (10)}$$

Here, F0=F1=0, F2=1

Whereas each term in the Fibonacci sequence is "the sum of the preceding two terms", each term in the tribonacci sequence is "the sum of the preceding 3 terms". For example, the first few terms of the tribonacci sequence are 0, 1, 1, 2, 4, 7, 13, 24, 44, 81, 149, 274, 504, . . . .

Next, the tetranacci sequence will be described. The nth tetranacci number (Fn) is defined by Expression (11) below.

[Math. 11]

$$Fn+4 = Fn + Fn+1 + Fn+2 + Fn+3 \quad (n \geq 0) \qquad \text{Expression (11)}$$

Here, F0=F1=F2=0, F3=1

In other words, each term in the tetranacci sequence is "the sum of the preceding four terms". For example, the first few terms in the tetranacci sequence is 0, 0, 0, 1, 1, 2, 4, 8, 15, 29, 56, 108, 208, 401, . . . . It should be noted that the terms in a sequence where the first two terms in the Fibonacci sequence are replaced with 2 and 1 are called Lucas numbers (Ln.) A typical term in a Lucas sequence is expressed by Expression (12) below. Furthermore, uniform random numbers are random numbers in which the probability of appearance of all values is equal.

[Math. 12]

$$Ln = (1+\sqrt{5})/2)n + ((1-\sqrt{5})/2)n \qquad \text{Expression (12)}$$

As described above, in lighting apparatus 100 according to Embodiment 3, arranging the coordinates of the centers of small lenses 154 based on Expressions (6) to (12) makes it possible to reduce the occurrence of illumination unevenness, and thus facilitate design, as in Embodiment 2.

(Other Modifications, and so on)

Although lighting apparatus 100 according to the present disclosure is described based on the foregoing exemplary embodiments, the present disclosure is not limited to the exemplary embodiment.

Although light source apparatus 202 including semiconductor laser elements is provided outside of lighting apparatus 100, and laser light is introduced inside lighting apparatus 100 via optical fiber 200 in the foregoing embodiments, lighting apparatus 100 is not limited to this form. For example, lighting apparatus 100 may include, at an end of case 102, semiconductor laser element 148 capable of emitting laser light along optical axis A.

Furthermore, optical component 153 may include concave small lenses 154 and convex small lenses 154. Small lenses 154 may be concave or convex relative to laser light L that has passed through condenser lens 151.

Furthermore, light distribution controlling structure 111 may be included on one face of cover 101, and light-dispersing structure 112 may be included on the other face. Furthermore, light-dispersing structure 112 and light distribution controlling structure 111 may be disposed aligned along optical axis A of laser light L. Accordingly, light distribution control of visible light V can be performed easily while maintaining the safety of lighting apparatus 100.

Furthermore, the area of structural units 115 provided in cover 101 may change in stages as the distance from optical axis A increases, or the area of structural units 115 may change continuously in accordance with the distance from optical axis A. Furthermore, the changing in stages and the continuous change may be combined. Furthermore, refracting region 116 and dispersing region 118 may partially overlap.

Forms obtained by various modifications to the exemplary embodiments that can be conceived by a person of skill in the art as well as forms realized by arbitrarily combining structural components and functions in the respective exemplary embodiments which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied, in numerous applications, only some of which have been described herein. It is intended by the following claims to claim any and all modifications and variations that fall within the true scope of the present teachings.

What is claimed is:

1. A lighting apparatus which uses laser light as a light source, and includes a light emitter which, when irradiated with the laser light, emits light of a wavelength different from a wavelength of the laser light, the lighting apparatus comprising:
   a condenser lens that condenses the laser light;
   a focusing lens that focuses, onto the light emitter, the laser light that has passed through the condenser lens; and
   an optical component disposed between the condenser lens and the focusing lens, the optical component including a plurality of lenses disposed at a plurality of locations on circumferences of virtual concentric circles, the virtual concentric circles including a center which is an origin,
   wherein lenses which are adjacent along a radial axis passing through the origin, among the plurality of lenses, have different phases with respect to the radial axis.

2. The lighting apparatus according to claim 1, wherein the virtual concentric circles are at same intervals.

3. The lighting apparatus according to claim 1, wherein center coordinates (x, y) of each of the plurality of lenses are disposed to satisfy expressions (1) to (5);

$$0 < D_{n+1} - D_n \leq 2 \cdot d \quad (1);$$

$$0 < k_n < 2 \cdot D_n \cdot \Pi / d \quad (2);$$

$$\theta_n = 360/k_n \quad (3);$$

$$x = D_n \cdot \cos(\theta_n \cdot A_m + b_n) \quad (4); \text{ and}$$

$$y = D_n \cdot \sin(\theta_n \cdot A_m + b_n) \quad (5),$$

where
d is a radius of the lens in a plan view,
n is a place in order, from the origin, of one of the virtual concentric circles,
$D_n$ is a radius of an nth one of the virtual concentric circles from the origin,
$k_n$ is a number of the plurality of lenses on the nth one of virtual concentric circles from the origin,
$\theta_n$ is an angle formed between centers of adjacent ones of the plurality of lenses on one of the virtual concentric circles with respect to the origin,
$A_m$ is an arithmetic progression where an initial term is 1, a term difference is 1, and a last term is $k_n$, and
$b_n$ is a phase of a center of one of the plurality of lenses.

4. The lighting apparatus according to claim 1, wherein center coordinates (x, y) of each of the plurality of lenses are disposed to satisfy expressions (6) to (8):

$$\theta_n = 360/(6 \cdot n) \quad (6);$$

$$x = \sqrt{3} d \cdot n \cdot \cos(\theta_n \cdot k_m + b_n) \quad (7); \text{ and}$$

$$y = \sqrt{3} d \cdot n \cdot \sin(\theta_n \cdot k_m + b_n) \quad (8),$$

where
n is a place in order, from the origin, of one of the virtual concentric circles,
$\theta_n$ is an angle formed between centers of adjacent ones of the plurality of lenses with respect to the origin,
d is a radius of one of the plurality of lenses in a plan view,
$b_n$ is a phase of a center of the one of the plurality of lenses, the phase following any one of a Fibonacci sequence, a tribonacci sequence, a tetranacci sequence, a Lucas sequence, and uniform random numbers, and
$k_m$ is an arithmetic progression where an initial term is 1, a term difference is 1, and a last term is $6 \cdot n$.

5. The lighting apparatus according to claim 1, wherein the plurality of lenses is arranged so that all phases of adjacent lenses from among the plurality of lenses are offset.

6. The lighting apparatus according to claim 1, wherein the origin corresponds to an optical axis of the laser light.

7. The lighting apparatus according to claim 1, wherein the plurality of lenses include concave lenses.

8. The lighting apparatus according to claim 1, wherein the plurality of lenses include convex lenses.

9. The lighting apparatus according to claim 1, wherein the plurality of lenses have one of a dimple shape and a projecting shape.

10. The lighting apparatus according to claim 1, wherein a shape of each of the plurality of lenses in a plan view is a circle.

11. The lighting apparatus according to claim 1, wherein a shape of each of the plurality of lenses in a plan view is not a circle.

12. The lighting apparatus according to claim 1, wherein the plurality of lenses is arranged side-by-side in each of the virtual concentric circles.

13. The lighting apparatus according to claim 1, wherein a light intensity distribution of the laser light that has passed through the condenser lens is converted from a Gaussian distribution into a top-hat distribution by the optical component.

14. The lighting apparatus according to claim 1, wherein the laser light that has passed through the condenser lens and that is focused by the focusing lens onto the light emitter has a circular shape.

15. The lighting apparatus according to claim 1, further comprising:
the light emitter;
a case in which the condenser lens, the optical component, the focusing lens, and the light emitter are disposed; and
a cover attached to a first side of the case, the first side of the case being opposite a second side of the case from which the laser light is irradiated.

16. The lighting apparatus according to claim 15, wherein the cover integrally includes a light-dispersing structure which crosses an optical axis of the laser light, the light-dispersing structure configured to disperse the laser light.

17. The lighting apparatus according to claim 16, further comprising:
a laser element provided externally of the case, the laser element emitting the laser light; and
a fiber extending from the laser element to the second side of the case for providing the laser light from the laser element to the condenser lens.

* * * * *